United States Patent [19]
Black

[11] 3,759,497
[45] Sept. 18, 1973

[54] IMPINGEMENT BAFFLE PLATE ASSEMBLIES

[75] Inventor: Bernard Black, Stanmore, England

[73] Assignee: Swemco Limited, London, England

[22] Filed: June 15, 1971

[21] Appl. No.: 153,202

[30] Foreign Application Priority Data
June 15, 1970 Great Britain.................. 28,785/70

[52] U.S. Cl...................... 261/113, 24/81 R, 52/489
[51] Int. Cl................................................. B01f 3/04
[58] Field of Search...................... 261/113; 24/264, 24/81 R; 52/489; 70/89, 90; 151/31

[56] References Cited
UNITED STATES PATENTS

| | | | |
|---|---|---|---|
| 2,262,946 | 11/1941 | Kistner.................................... | 70/90 |
| 2,319,814 | 5/1943 | Harmon.............................. | 261/113 |
| 2,420,242 | 5/1947 | Harmon.............................. | 261/113 |
| 2,457,658 | 12/1948 | Graham............................. | 261/113 |
| 2,457,667 | 12/1948 | Harmon.............................. | 261/113 |
| 2,457,686 | 12/1948 | Kopita............................... | 261/113 |
| 2,634,146 | 4/1953 | Johnson.............................. | 70/89 X |

*Primary Examiner*—Frank W. Lutter
*Assistant Examiner*—Vincent Gifford
*Attorney*—William C. Linton et al.

[57] ABSTRACT

An impingement baffle plate assembly in a scrubber tower comprises a plurality of impingement baffles mounted above a perforated plate. A peripheral frame lies beneath the perforated plate and forms part of the assembly, which is releasably mounted in the scrubber tower. The peripheral frame ensures flatness of the assembly so that the means fixing the assembly in the tower may be simplified and adapted for quick release of the assembly for repair or replacement.

2 Claims, 2 Drawing Figures

IMPINGEMENT BAFFLE PLATE ASSEMBLIES

BACKGROUND OF THE INVENTION

This invention is concerned with an impingement baffle plate assembly, particularly for use in gas scrubber towers.

Scrubber towers have for many years been equipped with impingement baffle plate assemblies comprising a perforated plate with a baffle situated over each perforation of the plate so that gas rising through the tower passes through the perforations and impinges on the baffle.

To ensure maximum efficiency the components of the assembly must be completely flat and horizontal in the tower. Hitherto ensuring that the components are suitably fixed in the tower has made removal for replacement and repair a lengthy business.

SUMMARY OF INVENTION

It is an object of the present invention to provide an impingement baffle plate assembly which may be quickly and simply incorporated or removed from a scrubber tower.

It is a further object of the present invention to provide an easily removable impingement baffle plate assembly having self contained means for ensuring flatness of the components.

There is provided according to the present invention an impingement baffle assembly comprising at least one impingement baffle extending over and spaced from a perforated plate, there being provided a supporting frame extending at least partially around the periphery of the assembly and adapted to be received in a scrubber tower.

The assembly may be located in a scrubber tower by engaging the supporting frame with support framework in the tower.

The peripheral frame ensures that the perforated plate remains flat when received in the scrubber tower. Accordingly, fixing means holding the assembly in position may be simplified, as they are no longer required to contribute to maintaining the perforated plate in a flat condition.

The or each impingement baffle may advantageously be of the type in which an elongate T-shaped member is notched in the horizontal branch portions to provide a series of individual baffles extending on either side of the stem portions. (A method of manufacturing a baffle of this type is described in British Pat. No. 1,222,097). The T-shaped member is then placed in relation to a perforated plate so that each individual baffle covers a perforation in the plate.

The baffle or baffles may be spaced from the perforated plate by welding each end of a T-shaped member to a raised flange portion of a flat bar and placing this welded unit on top of the perforated plate. The flange is preferably formed by bending one end of a plate through 180°. This provides for easier welding with no resulting distortion.

The supporting frame may be formed from angled plates placed in contact with the perforated plate on the opposite side to the impingement baffle. The assembly may then be welded together, or, more conveniently, the components may be placed on top of each other and held on the support frame work in the scrubber tower by a quick release device either attached to the assembly or the frame work.

The supporting frame extending around the periphery of the assembly provides additional strength and ensures that the assembly remains flat and horizontal. The baffle may be manufactured from various materials including steel and plastics, depending of course on the operating conditions. The assembly is also economically advantageous in that the amount of welding may be minimized.

BRIEF DESCRIPTION OF THE DRAWINGS

An assembly made in accordance with the invention is illustrated by way of example only in the accompanying drawings in which.

DETAILED DESCRIPTION

Figure 1:
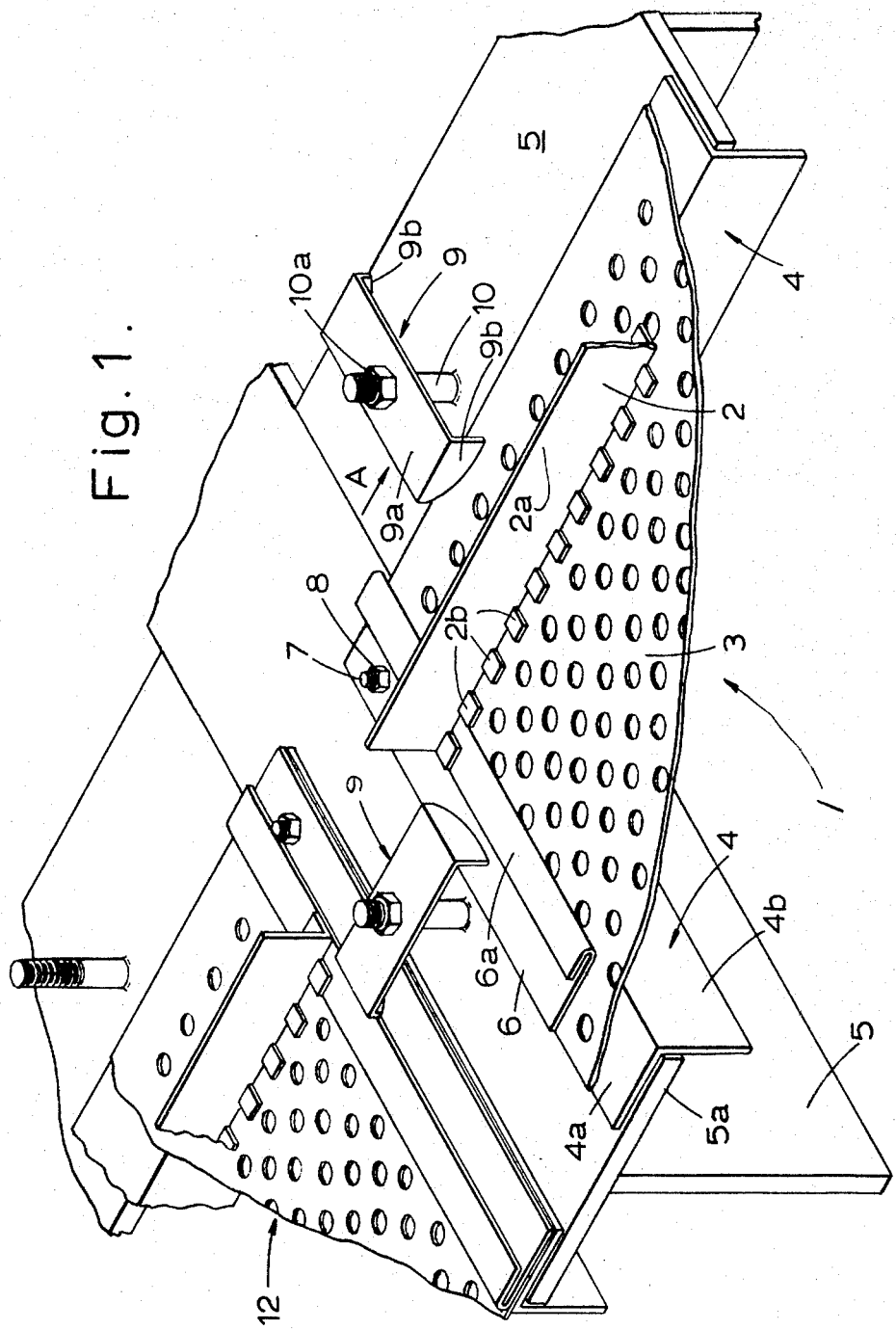
FIG. 1 is a fragmentary perspective view partly in section of an impingement baffle assembly mounted in a scrubber tower.

Referring to the drawings, an impingement baffle assembly, indicated generally at 1, is mounted in a scrubber tower (not shown) and comprises a plurality of impingement baffles 2 (one only shown), a perforated plate 3 and a peripheral frame 4.

The peripheral frame 4 is constructed from angled plates having horizontal portions 4a and vertical portions 4b. The horizontal portions 4a of the frame 4 rest on a horizontal flange 5a of a T-shaped supporting frame work 5 which is a fixture in the scrubber tower. The vertical portions 4b of frame 4 may be used as locating guides for the positioning of the frame 4 in the scrubber tower against the frame 5, if suitably dimensioned.

The perforated plate 3 rests on the peripheral frame 4. Extending over the perforated plate 3 and spaced from it are impingement baffles 2. These are formed of a vertical member 2a carrying a plurality of laterally extending platelets 2b on each side. Each baffle 2 is positioned with respect to the perforated plate 3 so that each platelet 2b lies over a perforation 3a of perforated plate 3.

The baffles 2 are supported at each end on a transverse member 6 (one only shown) the transverse member 6 has a folded over portion 6a to which the ends of the baffles 2 are welded and which raises them above the perforated plate 3. To ensure that the welded combination of baffles 2 and transverse members 6 are correctly positioned relative to the perforated plate 3 so that the perforation 3b are beneath platelets 2b, located bolts 7 are provided on frame 4 which pass through holes in the perforated plate 3 and the transverse member 6. A nut 8 on bolt 7 holds the assembly 1 together.

Figure 2:
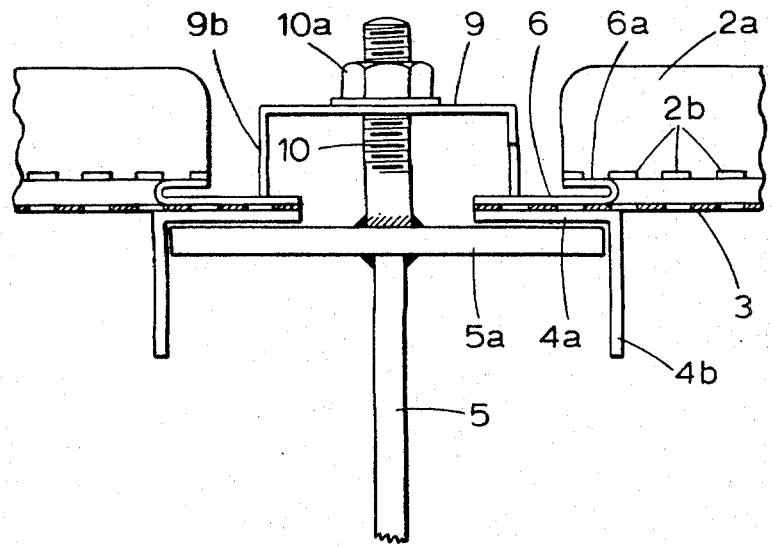
FIG. 2 is a fragmentary vertical section of two adjacent impingement baffle assemblies.

The assembly 1 is releasably retained on the frame work 5 by a quick release clamp 9. Clamp 9 has a horizontal portion 9a rotatable about an upright bolt 10 mounted on the frame work 5. Each end of the horizontal portion 9a carries an oppositely inclined downwardly extending cam piece 9b. The clamp 9 is shown with one cam piece 9b engaging the perforated plate 3 and forcing it and the underlying peripheral frame 4 against the frame work 5. A sharp blow in the direction of the arrow A on the horizontal portion 9a causes rotation thereof and the cam piece 9b disengages from the plate 3. Opposite movement causes the cam piece 9b to ride up over the edge of the perforated plate 3 until the horizontal portion 9a abuts the stop nut 10a positioned on bolt 10. The cam piece 9b then wedges the assembly 1 firmly in position. Another clamp 9 engages another edge of the assembly 1, see FIG. 2, this time engaging transverse member 6, and the remaining edges of the assembly are similarly held. Operation of the quick release clamps enables a complete assembly 1 to be quickly replaced. Preferably the components of the assembly are held together only by the bolt 7 and nut 8 so that any one of the components of the assembly may be removed and replaced.

Another assembly 12 lies next to assembly 1 and is retained in the tower by the second quick release clamp 9 and others not shown. By use of the impingement baffle assembly of the invention, the interior of the scrubber tower may be built up from a number of easily replaceable units.

I claim:

1. A scrubber tower having an internal supporting frame work and an impingement baffle plate assembly supported on said frame work, wherein:
   1. said impingement baffle plate assembly comprises:
      a. a perforated plate,
      b. a peripheral frame for supporting said perforated plate, said peripheral frame being positioned below said perforated plate,
      c. at least one impingement baffle plate supported at the periphery of said perforated plate but spaced from said perforated plate;
   said assembly being releasably mounted in said scrubber tower with said peripheral frame resting on said supporting frame work, and
   2. quick release means mounted on said supporting frame work and operative to engage said assembly, said quick release means comprising a horizontal member pivoted on said supported frame work and having at each end an oppositely inclined downwardly depending cam piece, said cam piece engaging said assembly and retaining said assembly against said supporting frame work by wedge action.

2. A scrubber tower having an internal supporting frame work and an impingement baffle plate assembly supported on said frame work, wherein:
   1. said impingement baffle plate assembly comprises:
      a. a perforated plate,
      b. a peripheral frame for supporting said perforated plate, said peripheral frame being positioned below said perforated plate,
      c. at least two flat bars overlying said perforated plate, each said bar above one of two opposed portions of said peripheral frame, each said bar having a raised flange formed by folding a portion of said bar through substantially 180°, and
      d. at least one impingement baffle plate comprising an elongate upright portion, and laterally extending on either side of said upright portion, a plurality of platelets,
   each end of said impingement baffle plate being secured to one said raised flange of one of said two flat bars, so that each said impingement baffle plate is spaced above said perforated plate with said platelets in registration with said perforations of said perforated plates; said assembly being releasably mounted in said scrubber tower with said peripheral frame resting on said supporting frame work, and
   2. quick release means mounted on said supporting frame work and operative to engage said assembly and retain said assembly against said supporting frame work.

* * * * *